United States Patent [19]

Stankosky

[11] Patent Number: 4,999,040
[45] Date of Patent: Mar. 12, 1991

[54] GLASSWARE FORMING MACHINE

[75] Inventor: Michael J. Stankosky, Windsor, Conn.

[73] Assignee: Emhart Industries, Inc., Towson, Md.

[21] Appl. No.: 418,766

[22] Filed: Nov. 2, 1989

Related U.S. Application Data

[63] Continuation of Ser. No. 73,540, Jul. 10, 1987, abandoned.

[51] Int. Cl.$^5$ .............................................. C03B 7/088
[52] U.S. Cl. ........................................ 65/325; 65/327; 65/328
[58] Field of Search ................. 65/126, 129, 132, 221, 65/324, 325, 330, 128, 326, 327, 328

[56] References Cited

U.S. PATENT DOCUMENTS 2,596,042  5/1952  Park ........................................ 65/330
3,516,812  6/1970  Donnelly et al. ...................... 65/330
3,554,726  1/1971  Daly ....................................... 65/325
4,230,476  10/1980  Vischer ................................. 65/328
4,581,054  4/1986  Mumford .............................. 65/328

FOREIGN PATENT DOCUMENTS 2079266  1/1982  United Kingdom .
2140001  11/1984  United Kingdom .

*Primary Examiner*—Joye L. Woodard
*Attorney, Agent, or Firm*—Spencer T. Smith

[57] ABSTRACT

A glassware forming machine contains molten glass and distributes runners of molten glass through a refractory orifice ring having a plurality of discharge holes. The refractory orifice ring includes an annular side wall of uniform cross-section, a bottom wall of uniform thickness, and a discrete number of strengthened areas on the interior of the annular side wall at selected locations equidistant from each pair of the holes. The periphery of each of the holes also has an increased thickness.

3 Claims, 2 Drawing Sheets

GLASSWARE FORMING MACHINE

This is a continuation of co-pending application Ser. No. 073,540 filed on July 10, 1987, now abandoned.

The present invention relates to glassware forming machines and more particularly to the refractory orifice ring for such which has a plurality of holes distributing a corresponding number of continuous runners of molten glass to a shear mechanism. Such an orifice ring which may be eleven inches in diameter is subject to a high thermal gradient (on the order of delta T=1700° F.) which can result in failure of the orifice ring.

Failure of the orifice ring can affect the glass in two significant ways. First, a fissure can score the surface of the glass and pass an imperfection on to the finished product. Second, the faulty orifice ring can allow the molten glass to leak from the feeder. These are both serious problems that can be expensive if they remain undetected. Failure also, of course, causes production time to be lost while the orifice ring is replaced and the system returned to normal.

Prior art multi-hole orifice rings are shown in U.S. Design Pat. Nos. 211,609 and 241,269 and the use of such an orifice ring is illustrated in U.S. Pat. No. 4,554,000. During such use, small, hairline stress cracks may develop at the outer periphery which cause the ring to fail when they reach one of the orifice openings.

It is an object of the present invention to provide an improved orifice ring which minimizes the likelihood that a stress crack will reach one of the orifice ring holes thereby extending the life of the orifice ring.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings:

FIG. 5 is a oblique view of the orifice ring shown in FIG. 2.

Figure 1:
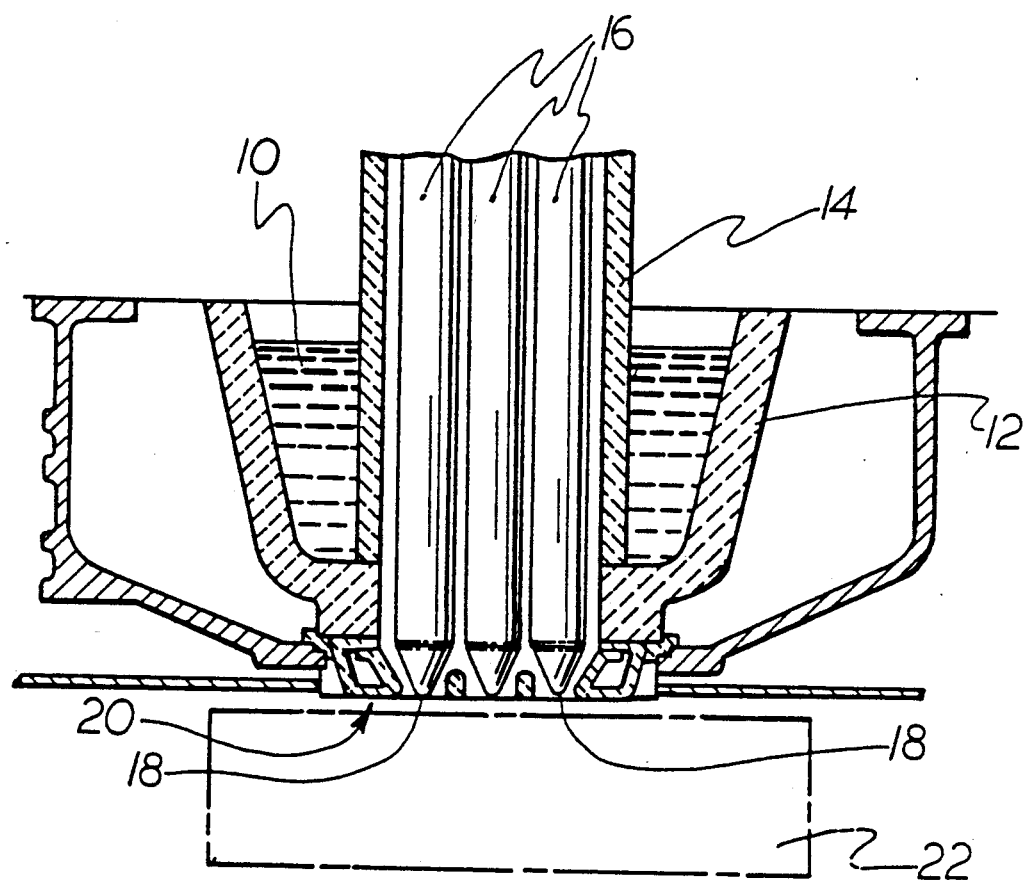
FIG. 1 is an elevational view of a glass spout bowl assembly which delivers molten glass through an orifice plate to a shear mechanism.
Figure 2:
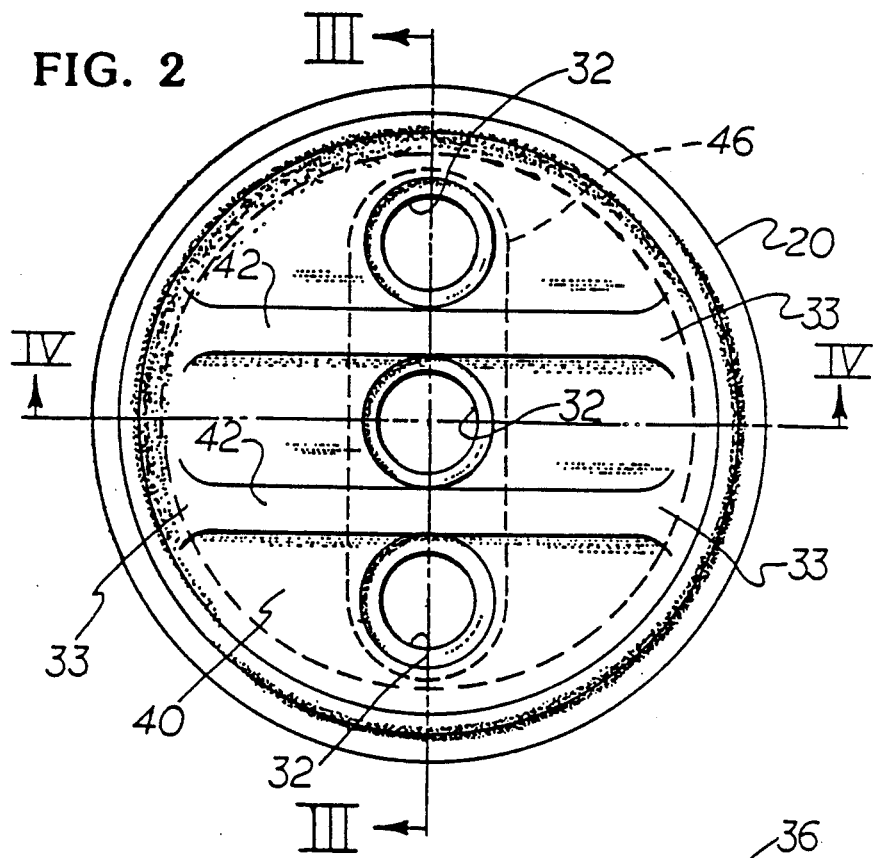
FIG. 2 is a view looking down into the orifice plate schematically shown in FIG. 1.

Molten glass 10 is contained within a spout bowl container defined by a refractory bowl 12 and a refractory tube 14 which surrounds a plurality of plungers 16. The lower ends 18 of the plungers 16 cooperate with an orifice plate 20 to allow runners of molten glass to be delivered to a shear mechanism 22. This shear mechanism shears the runners into discrete gobs which are fed to individual sections of a glassware forming machine (not shown).

Figure 3:
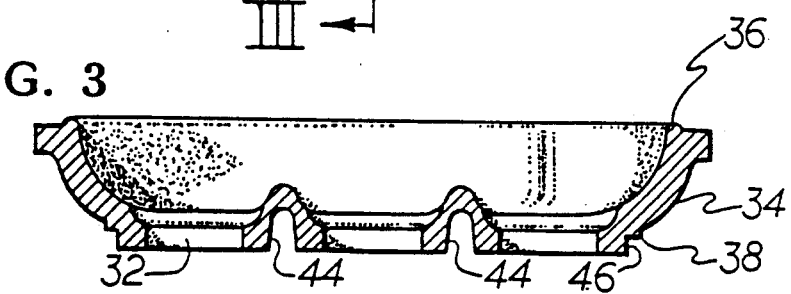
FIG. 3 is a view taken along lines 3—3 of FIG. 2.
Figure 4:
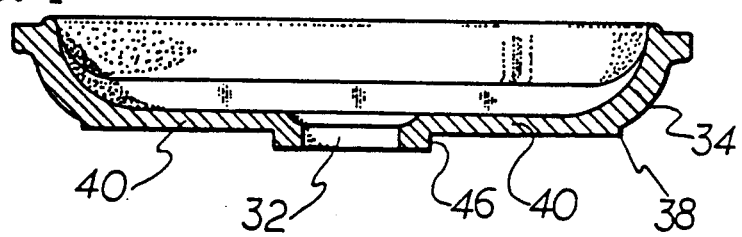
FIG. 4 is a view taken along lines 4—4 of FIG. 3.

The orifice ring 20, which has a plurality of holes 32 (here three in-line holes) is designed to define discrete areas 33, as far from the holes 32 as possible, where, in the event of fracture, the fracture will begin. To this end, the side wall 34 (FIG. 3) of the orifice plate which extends from the top 36 of the orifice plate to bottom outside edge 38 is of uniform configuration around the orifice plate and the bottom 40 of the orifice plate has a uniform thickness where it joins the side wall, except where a pair of parallel strengthening ribs 42 are located. These strengthening ribs, which have a uniform "V" shape in cross-section to receive cooling tubes, extend perpendicular to the array of holes 32 from one side of the orifice plate to the other, and merge with the sidewall 34 to define localized areas 33 at the periphery of the orifice plate where stress will be concentrated. Grooves 44 are defined in these strengthening ribs to receive cooling tubes (not shown) which maintain constant temperature across each hole so that the molten glass runners will be discharged vertically as desired. Since stress is concentrated at these discrete peripheral areas 33, when the orifice ring fractures, it will start at these areas with the generation of a hairline fracture which will proceed adjacent the strengthening rib 42 toward an orifice hole 32. These discrete areas 33 are located a maximum distance from the orifice holes to increase the distance a hairline fracture must travel to reach an orifice hole.

The straight linear array of orifice holes 32 is reinforced with a thickened section 46 which is slightly wider than an orifice hole and which extends completely along the linear array of holes 32 (except where the grooves cut across this section).

The function of this thickened section 46 is to define with the rib a reinforced area completely around each hole so that any hairline crack that reaches this area will either continue along the rib or be redirected along the margin of this thickened section, and hence, in a direction parallel to the array of holes thereby preventing the crack from reaching a hole.

I claim:

1. A glass feeder comprising
   a spout bowl assembly for containing molten glass including
     a spout bowl and
     a refractory orifice ring at the bottom of said spout bowl having a plurality of discharge holes defined therein through which runners of molten glass may flow,
   means for controlling the volume of the runners flowing through said orifice ring discharge holes,
   said refractory orifice ring including
     an annular side wall
     a planar bottom wall
     a discrete number of ribs defined in said bottom wall and extending between each pair of said discharge holes and merging into said annular side wall at selected locations equidistant from each pair of said holes, said ribs being "V" shaped in cross-section to receive cooling tubes, and
   said bottom wall joined to said annular side wall and having an increased thickness around the periphery of each of said discharge holes and a uniform thickness at all locations except at said ribs and said increased thickness,
   the cross-section of said annular side wall taken at any radial location around the ring having the same cross-section as the cross-section taken at any other radial location except where said ribs merge into said side wall.

2. A glass feeder according to claim 1, wherein said plurality of discharge holes in said refractory orifice ring is three and said three discharge holes are arranged in a straight array.

3. A glass feeder according to claim 2, wherein the increased thickness areas around said discharge holes defines a single elongated raised area having parallel sides.

* * * * *